United States Patent [19]

Cote et al.

[11] Patent Number: 6,021,262
[45] Date of Patent: Feb. 1, 2000

[54] SYSTEM AND METHOD FOR DETECTION OF, NOTIFICATION OF, AND AUTOMATED REPAIR OF PROBLEM CONDITIONS IN A MESSAGING SYSTEM

[75] Inventors: Joseph Paul-Emile Pierre Cote, Issaquah; Stephen David Thomas, Bellevue, both of Wash.

[73] Assignee: Microsoft Corporation, Redmond, Wash.

[21] Appl. No.: 08/678,819

[22] Filed: Jul. 12, 1996

[51] Int. Cl.[7] .................................................. G06F 11/22
[52] U.S. Cl. .............................. 395/185.01; 395/184.01; 395/185.1; 395/200.53; 395/200.54
[58] Field of Search ........................... 395/184.01, 185.1, 395/200.54, 185.01, 200.53

[56] References Cited

U.S. PATENT DOCUMENTS

| | | | |
|---|---|---|---|
| 4,691,346 | 9/1987 | Vanacore | 379/198 |
| 5,218,699 | 6/1993 | Brandle et al. | 395/684 |
| 5,247,676 | 9/1993 | Ozur et al. | 395/684 |
| 5,283,856 | 2/1994 | Gross et al. | 706/47 |
| 5,367,670 | 11/1994 | Ward et al. | 395/184.01 |
| 5,619,656 | 4/1997 | Graf | 395/200.54 |
| 5,696,486 | 12/1997 | Poliquin et al. | 340/506 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Primary Examiner—Kenneth S. Kim
Attorney, Agent, or Firm—Workman Nydegger Seeley

[57] ABSTRACT

The present invention is directed to systems and methods for automatically monitoring the status of messaging software. When a deficiency in the messaging software or a messaging link connecting messaging systems is detected, the invention refers to a configurable schedule of settings that defines actions to be taken. Actions may include identifying at least one message that should be sent when a particular warning or alert occurs, identifying the method to send the message, identifying the destination or recipient of the message, and identifying a time to send the message. In addition, the schedule allows an administrator to configure operation times for notification methods. If the system decides that notification should be sent via a method that is not allowed to operate until a certain time, notification using that method will be delayed until the allowed time. Using the time to send the notification, the method that should be used to send the notification, and the time that the identified notification method is allowed to execute, the system schedules the notifications and sends the appropriate notifications when the time arrives. If indicated by the schedule, the system will also undertake automatic repair of the deficiency by performing such actions as stopping and restarting various software components, executing new software components, or performing an automated shutdown and restart of the affected system. An administrator can prevent attempts at automated repair by placing a system in a maintenance mode which locks out all automated repair actions but leaves notification actions intact.

28 Claims, 5 Drawing Sheets

SYSTEM AND METHOD FOR DETECTION OF, NOTIFICATION OF, AND AUTOMATED REPAIR OF PROBLEM CONDITIONS IN A MESSAGING SYSTEM

BACKGROUND OF THE INVENTION

The invention is directed to monitoring a server and a network.

A distributed computing system typically includes a user computer, e.g., a client computer, that communicates with a server computer over a network. Different kinds of application systems may be implemented using the distributed computing system. One of these systems is a database system in which a server-based database program provides a client-based database program with access to a database stored at the server. Another of these systems is a word processing system in which a server-based document management program provides a client-based editing program with access to documents stored at the server.

Still another of these systems is a messaging system that allows a user to direct a message from a source location, e.g., a messaging server, on the messaging system to a destination location, e.g., another messaging server, on the messaging system. Each location is preferably controlled by messaging software that includes software modules, i.e., services. Each service has a function such as receiving or storing incoming messages, providing a user at the location with access to the user's messages, or handling outgoing messages created by the user.

The locations are connected by messaging links. The message is delivered by transferring the message across one or more of the links to the messaging software at the destination for storage at a mailbox located at the destination. Typically, these links include computer data connections, such as network connections in the distributed computing system, and gateways and routers that tie networks together to form larger networks. Thus, the delivery can take place across numerous and disparate interlinked networks, including the Internet.

Typically, from time to time, the messaging software at one or more of the locations develops a deficiency such as a software condition that interferes with, e.g., creation of a message, access to a message, or delivery of a message. Such a software condition may include a non-functioning service or a problem with other software, such as an operating system, that supports the messaging software.

In addition, from time to time, a link in a messaging system develops a link condition that can cause a message delivery failure or a message delivery delay or both. A delivery failure is a failure of a message to arrive at the mailbox to which the message is directed. A delivery delay is a delay in the arrival of the message at the mailbox. A delivery failure or a delivery delay can occur if, e.g., the messaging system develops a computer hardware deficiency or a configuration deficiency that causes a message destination to become insufficiently connected with the messaging system. In addition, a message delivery delay can occur due to a significant increase in the link's message traffic, i.e., the volume of messages transferred across the link during a time period. Furthermore, if the link includes cables or wires, a delivery failure or delay can occur as a result of damage or wear involving the cables or wires.

The messaging system is typically associated with one or more system administrators that are responsible for addressing software conditions and link conditions.

SUMMARY OF THE INVENTION

A technique is provided wherein a deficiency detected in an application system, e.g, a messaging system, that is implemented on a distributed computing system is automatically brought to the attention of an administrator in a notification process. The notification process has a configurable schedule of urgency levels and actions that can be taken to make the administrator aware of the deficiency. The actions include sending a messaging system message to the administrator, starting a software application to notify the administrator via another means, such as a pager, and causing a message to appear immediately on a computer screen. The actions may be selected to be executed at points staggered in time according to an escalated need for attention to the deficiency. A service-hours feature is preferably included as well so that deficiency notification can be configured to coincide with the administrator's work schedule.

In addition, the technique provides that when the deficiency detected is related to a software service that is expected to be running on the server, the service can be automatically restarted. When restarting the service is unsuccessful, the server can be automatically restarted after an orderly shutdown. To allow a monitored server to be configured temporarily to run without automatic restarting, a maintenance mode is provided that prevents the automatic restarting.

A method of notification is provided that allows an administrator to control how and when the administrator is to be notified of a deficiency in an application system, i.e., a messaging system. In addition, the administrator is able to control how and when others are to be so notified. The method of notification is also able to notify the administrator of a deficiency involving the messaging system regardless of whether the messaging system is non-functional. For example, the administrator is notified by using a device such as a pager. The method of notification is also able to notify additional recipients as additional time passes after detection of the deficiency giving rise to the notification.

A method of addressing a deficiency in an application system, e.g., a messaging system, is also provided that is able to resolve a software service deficiency without intervention from the administrator. The method is configurable to attempt first to resolve a software service deficiency in a minimally intrusive way.

In one aspect, the invention features a method of addressing a deficiency in a distributed computing system, the method including detecting the deficiency, and, based on the detection, automatically causing a service to start on a server of the distributed computing system.

Implementations of this aspect of the invention may include one or more of the following features.

Automatically causing the service to start may include automatically causing an orderly shutdown of the server, the orderly shutdown leading to a restarting of the server. The orderly shutdown may be automatically caused if automatically causing the service to start is insufficiently successful. The service may be automatically caused to start only if a maintenance mode is not selected.

The distributed computing system may include a messaging system and the messaging system may include the service that is automatically caused to start. The method may further include providing a notification of the deficiency.

In another aspect, the invention features a method of addressing a deficiency in a distributed computing system, the method including detecting the deficiency, selecting a notification action by referring to a configurable schedule of pre-selected settings corresponding to the deficiency, and executing the notification action.

Implementations of this aspect of the invention may include one or more of the following features.

The schedule may correspond to a set of urgency levels including a warning level and an alert level and an alert notification action corresponding to the alert level may indicate more urgency than a warning notification action corresponding to the warning level. The alert notification action may be executed subsequently to an execution of the warning notification action.

Executing the notification action may coincide with a pre-selected time period and may include sending a messaging system message, sending a network priority message, or executing a notification application, such as a program that causes a pager communication.

A plurality of notification actions may be selected and the method may further include inserting a delay period between the execution of at least one of the notification actions and the execution of at least one other of the notification actions. The notification actions may be directed to different recipients.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
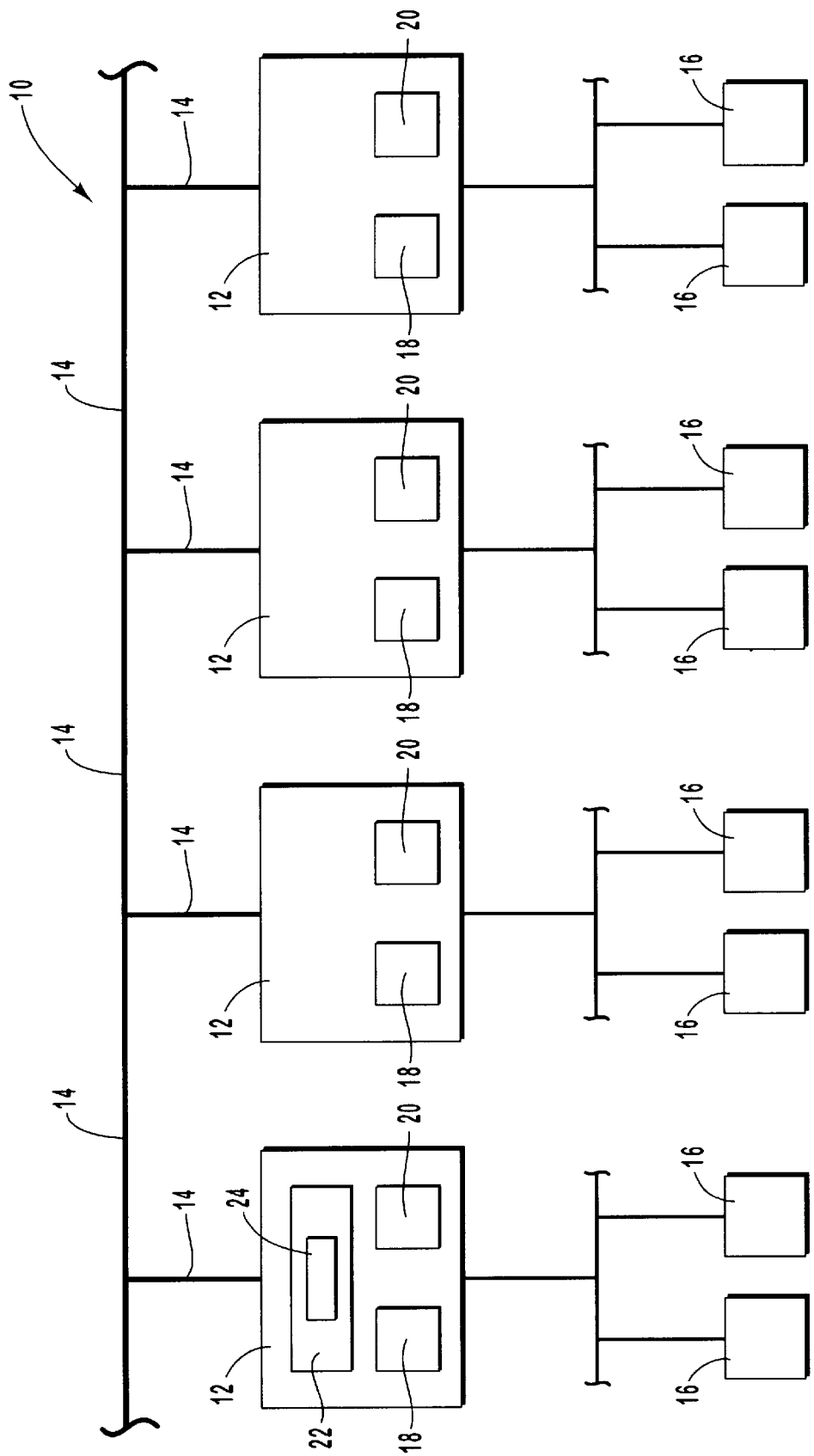
FIG. 1 is a block diagram of a messaging system.

FIG. 1 illustrates a messaging system 10 in which messaging servers 12 are connected by messaging links 14. Preferably, each server is also connected to user computers 16, such as client computers in a client-server networked computer system. Each server runs messaging software 18 that has services for receiving and storing incoming messages, providing users with access to messages, and handling outgoing messages created by the users. In addition, each server runs an operating system 20 that supports the messaging software by, e.g., starting message software services and allowing the services to make use of the computer hardware resources of the server.

The messaging system runs monitoring software 22 that detects software conditions and link conditions that interfere with the operation of the messaging system. The software conditions include the failure of a server's service, such as an operating system service or a messaging software service, to start or the non-functioning of such a service after being started. For each server monitored by the monitoring software, software conditions are preferably detected for multiple services, including a service used for communicating across the Internet and at least three messaging software services: a directory service, a message store service, and a message transfer agent ("MTA") service. The directory service maintains records of locations of mailboxes in the messaging system and is used in the delivery of a message. The message store service stores and retrieves incoming messages for reading and other manipulation by users associated with the server. The MTA service consults the directory service to deliver messages in the messaging system.

The link conditions detected by the monitoring software relate to, e.g., an excessive delay in the delivery of a message or message delivery failure. For example, a link's message traffic, i.e., the volume of messages transferred across the link during a time period, may increase to the point that the traffic approaches the link's message traffic capacity. In such a case, messages may be excessively delayed in a queue before the link. If so, the monitoring software detects the traffic-increase link condition by detecting the excessive delay.

Associated with the monitoring software is a notification and repair ("N/R") service 24 that is triggered by a detection of a software or link condition. The N/R service is able to bring the condition to the attention of a messaging system administrator and, depending on the nature of the condition, take action with the purpose of automatically addressing the condition. As described below, the administrator can configure the N/R service to react in different ways, depending on the nature of the condition.

Figure 2:
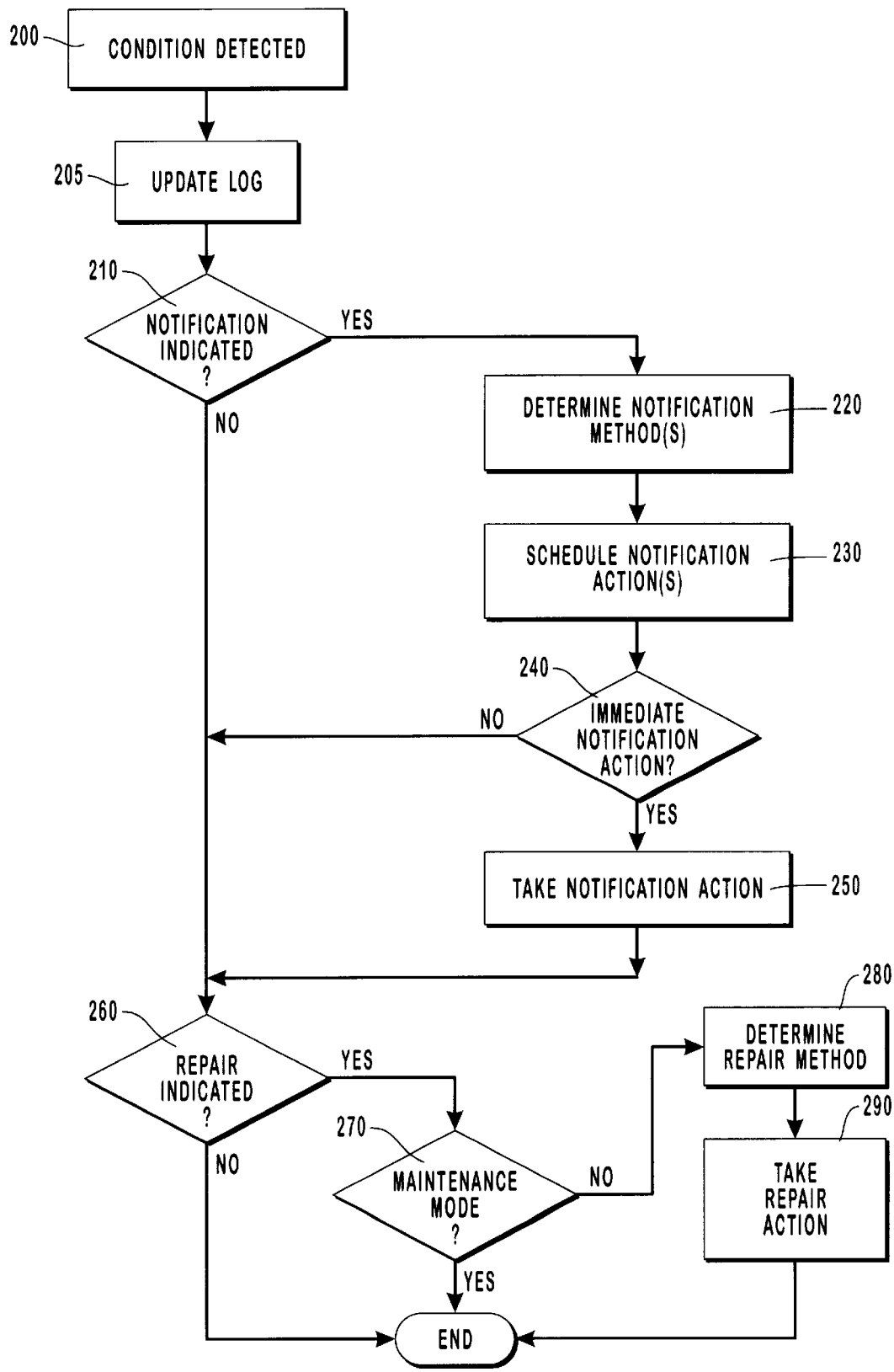
FIG. 2 is a flow chart of a notification and repair procedure.

FIG. 2 illustrates the procedure followed by the N/R service. After the condition is detected by the monitoring software (step 200), the N/R service makes a record of the condition in a condition log (step 205). The condition log is important because, at the end of each month of service, for example, the administrator is able to make judgments about the messaging system by reviewing statistics derived from the log records. Preferably, for example, each delay-related link condition is detected as a result of a delivery delay that exceeds either a warning threshold or an alert threshold. This delivery delay is typically caused by a software or hardware problem.

Figure 3:
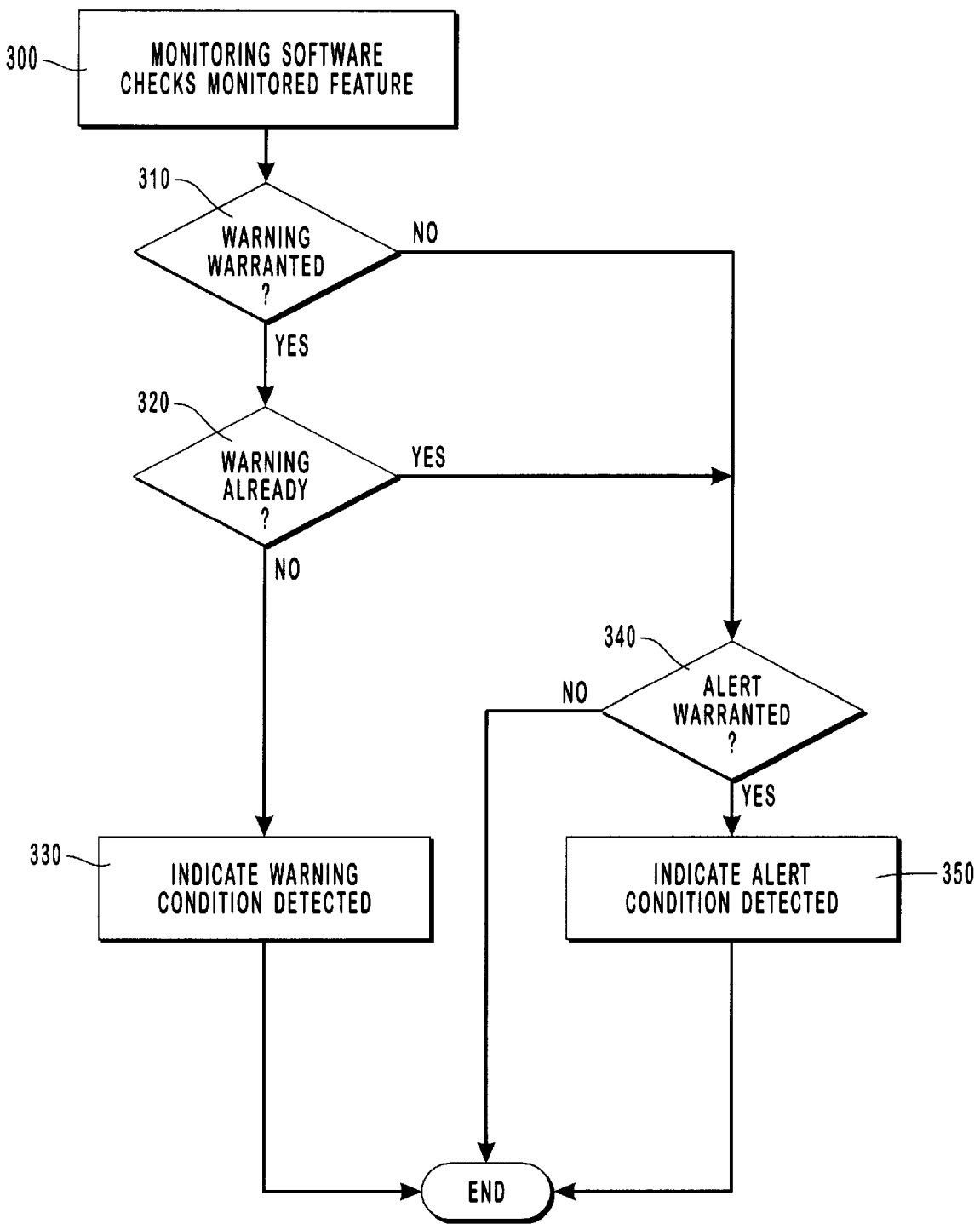
FIG. 3 is a flow chart of a condition detection procedure.
Figure 4:
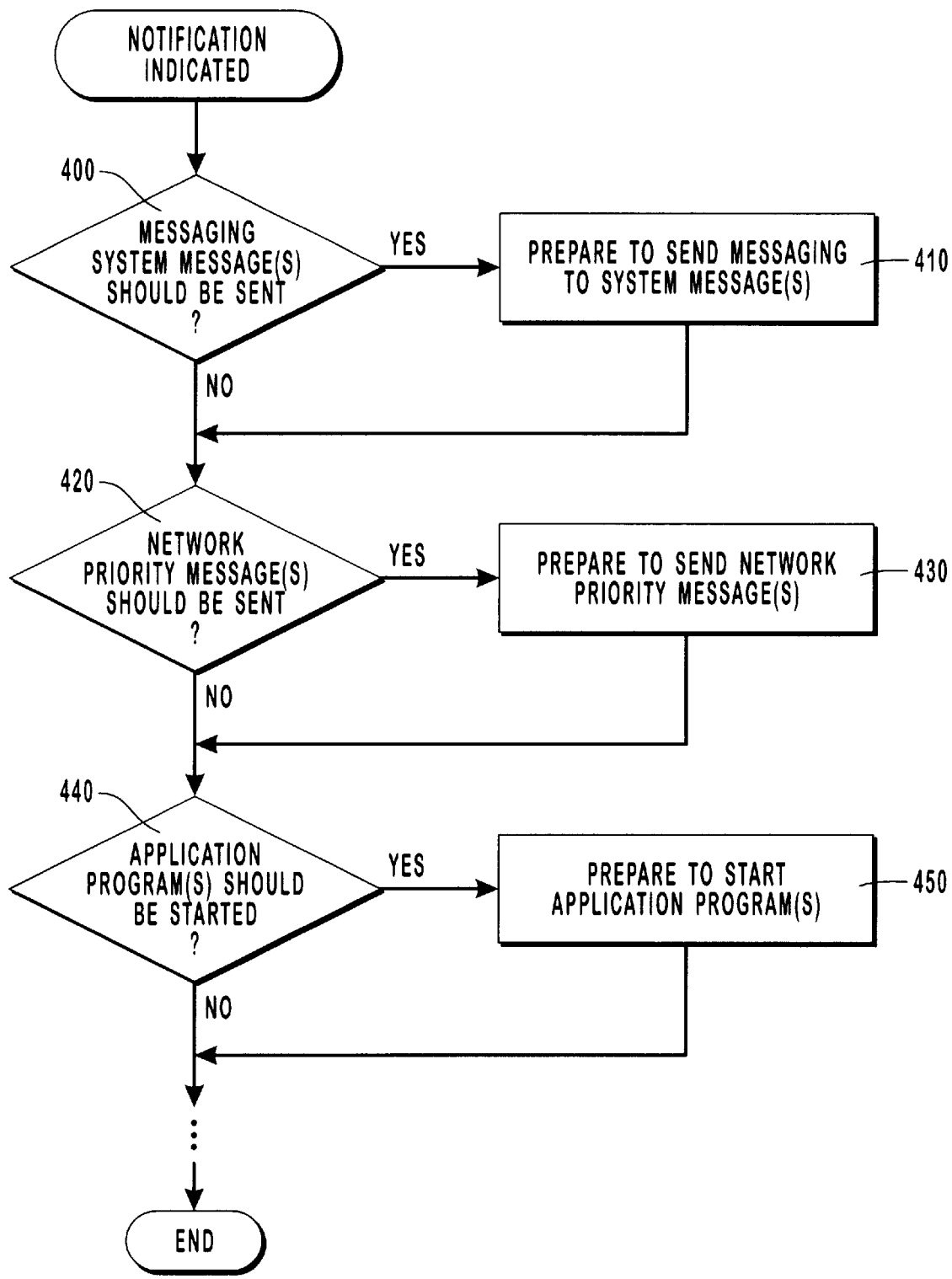
FIG. 4 is a flow chart of a notification action preparation procedure.

The warning and alert thresholds are pre-set by the administrator according to the administrator's intentions for the messaging system. For example, the administrator may intend that messages sent along a particular link in the messaging system should be delivered within 45 minutes. If so, for that link, the administrator may set the message delay warning threshold to 15 minutes and the corresponding alert threshold to 45 minutes. Therefore, a link condition is detected a first time when the warning threshold is reached and then is detected again, if the condition still exists, when the alert threshold is reached. FIG. 3 illustrates a preferred implementation of a periodic condition detection procedure that involves warnings and alerts. First, the monitoring software checks the monitored feature, e.g. a message delivery time, to determine the status of the feature (step 300). Next, the monitoring software determines whether the feature's status warrants a warning, e.g., whether the message delivery time exceeded 15 minutes (step 310). If a warning is warranted, and if a condition detection has not already been indicated in the previous instance of the periodic detection procedure (step 320), a warning condition detection is then indicated (step 330).

On the other hand, if a warning is not warranted or if a condition detection has already been indicated, the monitoring software then determines whether an alert is warranted (step 340). Such a determination is made even in the absence of a warning because the administrator is able to configure the monitoring software to generate alert condition detections that are not preceded by warning condition detections. If an alert is warranted, an alert condition detection is then indicated (step 350).

Both warning and alert detections are recorded in the condition log. As a result, at the end of each month, the administrator is able to determine, for example, how often a link-related condition was able to be addressed quickly enough to avoid an alert threshold. A similar use may be made of detections of software conditions, which are also recorded.

After updating the log, the N/R service then determines whether notification of someone such as the administrator is indicated as a response to the condition detected (FIG. 2, step 210). The N/R service so determines by referring to a schedule of settings that are pre-selected for the condition by the administrator. Preferably, for each link and software service that is monitored by the monitoring software, the administrator is able to make a variety of settings, including, as described above, warning and alert thresholds. The settings that relate to detection and notification of a condition for a particular link or service are described below and include (1) whether to notify the administrator and others of the detection, (2) the methods of such notification actions, and (3) the scheduling of such notification actions.

If notification is indicated, the N/R service consults the settings for the condition to determine the notification method or methods, i.e., action or actions, selected by the administrator (step 220). The methods preferably include the use of messaging system messages, network priority messages, and notification applications.

FIG. 3 illustrates a preferred implementation of such a determination. If the condition's settings indicate that one or more messaging system messages should be sent (step 400), the N/R service prepares to send messaging system messages that notify the messages' recipients of the condition detected (step 410). For each recipient, the N/R service so prepares by first retrieving, from the settings, the location of the messaging mailbox of recipient selected by administrator, i.e., the recipient's messaging address. Preparation of the message is then completed by setting up the message to arrive at the address and including in the message information about the detection, including a description of the link or service involved. The message may be directed to any messaging address, including an address across the Internet.

If the condition's settings indicate that one or more network priority messages should be sent (step 420), the N/R service prepares to send these messages in much the same way as described above for the messaging system message (step 430). However, the use of a network priority message differs from the use of a messaging system message in at least four important ways. First, the network priority message is sent not to a particular messaging address but to a specific user computer, selected by the administrator, in a networked computer system associated with the messaging system. In particular, the priority message is directed to appear immediately on the display device, e.g., the computer monitor, of the specific user computer, without being retrieved by a user employing the messaging software. In fact, the specific user computer need not run any messaging software in order to receive the network priority message; the network priority message is delivered independently of the messaging system. Second, the priority message is handled with a high priority by the messaging system. This handling allows the priority message to bypass queues of messaging system messages and other instruments of delay so that the priority message arrives at the specific user computer immediately. Third, in most cases, the priority message can be sent to only a subset of the user computers that can be reached by a messaging system message. For example, in most cases, the priority message cannot be made to appear immediately on the display device of a user computer that is connected across the Internet. The subset of user computers, to which the priority message can be sent, generally includes user computers that are connected for purposes in addition to messaging, i.e., are connected in the networked computer system. Finally, the fourth important way that the uses differ is that the priority message is available at the user computer only if the user computer is functioning and has been set up to receive priority messages in the networked computer system. For example, the priority message is not available at the user computer if the user computer is off or if the computer has not been "logged in", i.e., has not been set up by a user to receive priority messages. In addition, the priority message does not wait for the user computer to become functional and to be set up to receive priority messages; if the computer is not ready to receive the priority message, the priority message never appears. In contrast, in most cases, a messaging system message is delivered to a user's mailbox regardless of the user's activities. The user can gain access to the messaging system message at any time after delivery.

Lastly, if the condition's settings indicate that one or more notification applications, i.e., programs that can cause someone such as the administrator to be notified by, e.g., pager, should be started (step 440), the N/R service prepares to start the applications (step 450). For each application, the N/R service so prepares by first retrieving, from the settings, a pointer to the application that was pre-selected by administrator. If, for example, the operating system is a Microsofts operating system such as Microsoft° Windows NT®, the pointer includes the name and location of an ".EXE" or ".BAT" file, i.e., a file containing or pointing to an executable program, and parameter information. As mentioned above, the application may be a pager application, e.g., "PAGER.EXE". If so, the pointer may include a text string such as "C:APPLICATIONS PAGER.EXE [MESSAGE]". In such a case, "[MESSAGE]" is the text of a message to display on the pager. The message to display on the pager includes information about the condition detected.

Preferably, for each detection of a condition, the N/R service is able to prepare multiple notification actions that are intended to notify multiple persons. For example, the administrator may have an administrative staff wherein every staff member is able to receive messaging system messages but only a few members of the staff have pagers. If so, the N/R service is able to prepare not only a messaging system message for each person in the staff but also pager notification applications for staff members with pagers.

After the preparation of one or more notification actions is completed, the N/R service then determines, from the administrator's settings, a scheduled time for executing each notification action (FIG. 2, step 230). For example, a messaging system message may be scheduled to be sent immediately and to be followed 15 minutes later by a network priority message. Scheduling the notification actions is important because scheduling allows the N/R service to implement a notification escalation procedure and a service-hours procedure. In the escalation procedure, notification actions are preferably staggered over time and are prioritized according to urgency. For example, the administrator may select an escalation procedure in which only a small portion of the administrator's staff, e.g., one member, is first notified, with other members being notified later. Such an escalation may be organized to correspond to a management hierarchy within the staff. In such a case, a staff member with management responsibilities, i.e., a manager, may be notified of a condition detection only if the condition cannot be addressed immediately by a front-line staff member.

The service-hours procedure allows the administrator to specify, in the settings, periods of time during which a notification action is permitted to execute. For example, an administrator that prefers to receive immediate notifications by pager may prefer to receive such notifications only during working hours, e.g., 9 a.m. to 5 p.m. To prevent the N/R service from activating the administrator's pager outside the working hours, the administrator specifies the working hours as the service hours. As a result, a detection occurring during working hours triggers an immediate notification, but a detection occurring outside the working hours, e.g., in the middle of the night, triggers a notification that is delayed. The delayed notification executes at the beginning of the working hours, e.g., at 9 a.m.

Figure 5:
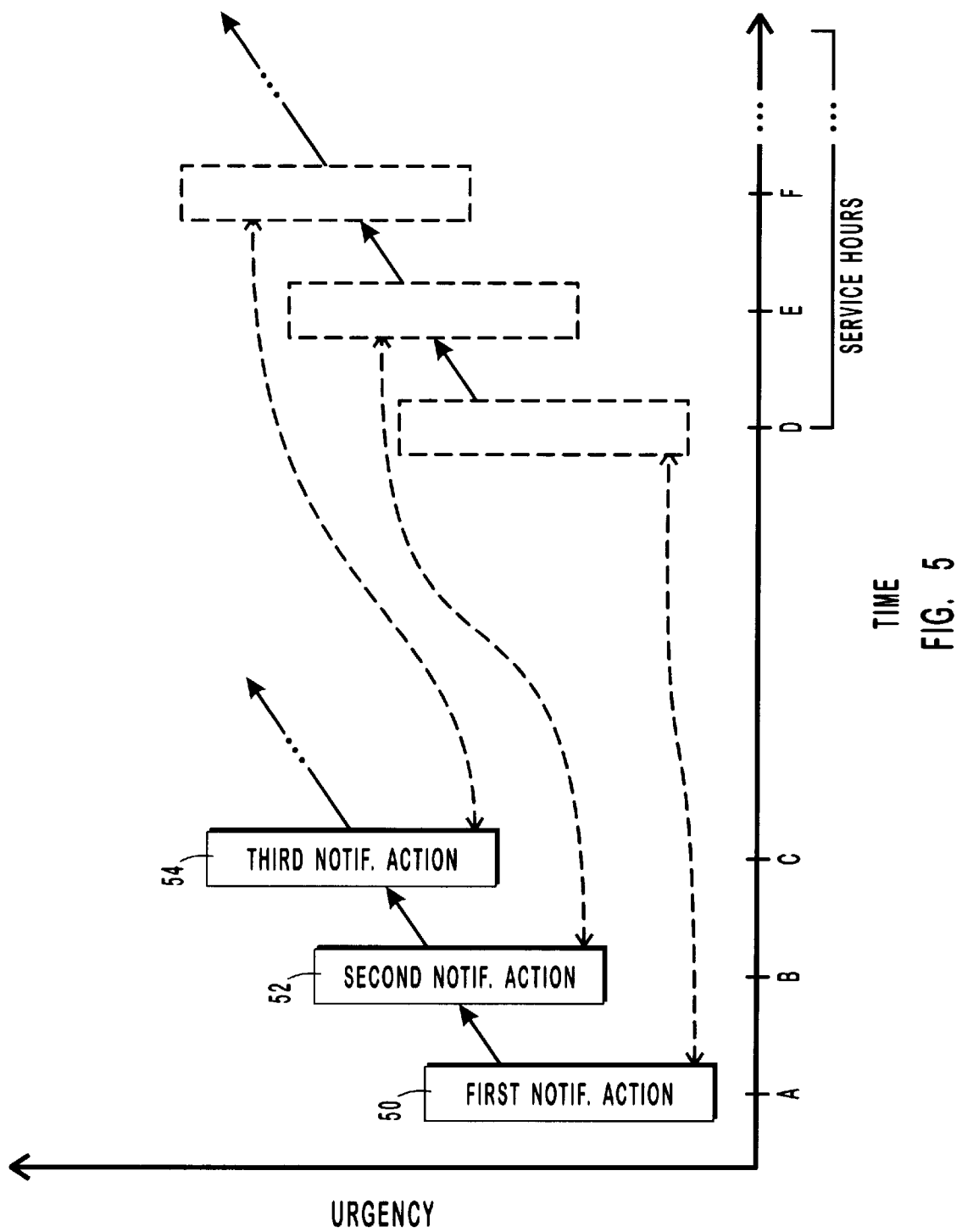
FIG. 5 is a chart of an escalation procedure and a service-hours procedure.

As shown in FIG. 5, the service-hours procedure may be combined with the escalation procedure so that the notifications specified in the escalation procedure are delayed to execute within the service hours. For example, the administrator may pre-select settings that specify an immediate notification 50 by a messaging system message (time A), with various network priority message notifications 52, 54 following every 15 minutes thereafter (e.g., times B and C). The various network priority message notifications 52, 54 may reflect different urgency levels for the administrator, depending on the intended recipients of the notifications.

If the settings are so pre-selected, and if the service hours are set to the working hours described above, a detection occurring in the middle of the night, i.e., at time A, causes the following messages to be sent: a messaging system message at 9:00 a.m. (time D), a priority message at 9:15 a.m. (time E), another priority message at 9:30 a.m. (time F), and so on.

After the notification actions are scheduled, the N/R service determines whether any of the actions are scheduled to execute immediately (FIG. 2, step 240). If so, the actions so scheduled are executed (step 250).

Regardless of whether one or more notification actions are executed or scheduled, the N/R service then determines whether an automatic repair is indicated (step 260). The N/R service so determines by referring again to the condition's settings as pre-selected by the administrator. In the embodiment described herein, the settings do not provide for automatic repair of link conditions. However, nothing prevents an automatic repair action from being used for the purpose of addressing a link condition.

Even if the settings for the condition indicate an automatic repair, the N/R service does not execute the automatic repair if a maintenance mode has been selected by the administrator (step 270). The maintenance mode is provided to allow the administrator to suppress automatic repair actions temporarily. The administrator so suppresses while, e.g., a system re-configuration or a non-automatic repair is underway that generates conditions that are set for automatic repair. In such cases, suppressing the automatic repair actions prevents the automatic repairs from interfering in the re-configuration or a non-automatic repair. The maintenance mode may also be used when the administrator allows the server to run a program, such as a software application under development, that may lead to software conditions.

If the N/R service is not set to the maintenance mode, the N/R service determines the repair method, i.e., repair action, that is appropriate for the condition detected (step 280). For some conditions, the repair action is straightforward. For example, the condition detected may be that an inaccuracy exists in a time-of-day value provided by a clock service used by the messaging system. If so, the N/R service determines that the appropriate automatic repair action is to cause the clock service to update the time-of-day value to correspond to a known accurate time-of-day value.

For other conditions, however, the repair action is more involved. For example, the condition detected may be that one of the messaging software's services, such as the directory service, is not functioning. In such a case, the N/R service determines the repair action by referring to a history of the detected condition and by referring to the settings pre-selected by the administrator. The history provides the N/R service with information about how many automatic repair action attempts have been made to address an instance of the condition since the initial detection of the instance. The administrator is able to pre-select, for each attempt in a sequence, the action to be taken after detection of the instance. The automatic repair actions are described below and include restarting the service and restarting the server on which the service is intended to run. For example, the administrator can arrange the settings for the condition so that the first and second attempts cause a restarting of the service and the third and subsequent attempts cause a restarting of the server.

After determining the automatic repair action to use, the N/R service causes the repair action to execute (step 290). Restarting the service is preferably accomplished by using an operating system facility that controls services. Preferably, given the name of the service, the operating system first determines, from stored configuration information, a command structure for starting the service and then uses the command structure to start the service.

Restarting the server is preferably accomplished by directing the operating system to execute an orderly shutdown-and-restart procedure provided by the operating system. The shutdown-and-restart procedure first notifies, preferably by using network priority messages, users of the server that a shutdown is imminent. Notification of the shutdown allows the users to save their work and otherwise prepare for the unavailability of the server. After waiting for a period of time sufficient to allow the users to so prepare, the shutdown-and-restart procedure then selects a restart setting in the operating system and executes an orderly shutdown. In the orderly shutdown, the operating system first closes any files that are open and takes other steps intended to minimize data loss due to the shutdown. Finally, the operating system completes the shutdown by directing the server to restart the operating system.

Other embodiments are within the scope of the following claims. For example, if a link condition is able to be automatically repaired, e.g, by executing a software application, a repair action may be used for repairing the link condition. In addition, other notification actions may be used, including actions making use of facsimile transmissions or telephone communications or a combination.

What is claimed is:

1. A method for identifyinig deficiencies in a distributed computer system comprising a plurality of interconected server computers, for initiating notification actions in response to identified deficiencies, and for attempting automated repair of identified deficiencies in a server computer, said method comprising the steps of:

detecting at least one of a plurality of predetermined deficiency conditions that interfere with normal operation of any of said plurality of server computers in said distributed computer system;

obtaining information stored in a schedule of settings that defines actions to be taken when said at least one of said plurality of deficiency conditions occurs; and using a notification and repair process stored at the server computer at which the deficiency is detected to select, based on said information, a course of action including at least one of either;

sending a deficiency notifier of said at least one of said plurality of deficiency conditions by using the notification and repair process stored at the server computer to 1) idenitify a notification to be sent, identify a method for sending said notification, identify a destination for said notification, and identify a time to send the notification, and then 2) when said time arrives, send said notification to said destination by said identified method for sending notification; or testing whether the server computer with said deficiency is in a maintenance mode and only if said server computer is not in said maintenance mode then automatically repairing said at least one of said plurality of deficiency conditions by performing at least the steps of 1) identifying what actions should be taken to automatically repair said at least one of said plurality of deficiency conditions and then 2) initiating said actions.

2. The method of claim 1, wherein
  the schedule corresponds to a set of urgency levels comprising a warning level and an alert level; and
  an alert notification action corresponding to the alert level indicates more urgency than a warning notification action corresponding to the warning level.

3. The method of claim 1, wherein sending the deficiency notifier comprises sending a messaging system message.

4. The method of claim 1, wherein sending the deficiency notifier comprises sending a network priority message.

5. The method of claim 1, wherein sending the deficiency notifier comprises executing a notification application.

6. The method of claim 1, wherein sending the deficiency notifier comprises the steps of:
  selecting a plurality of notification actions; and
  inserting a delay period between the execution of at least one of the notification actions and the execution of at least one other of the notification actions.

7. The method of claim 6, wherein
  at least one of the notification actions is directed to a first recipient; and
  at least one other of the notification actions is directed to a different, second recipient.

8. The method of claim 2, wherein the alert notification action is executed subsequently to an execution of the warning notification action.

9. The method of claim 1, wherein sending a deficiency notifier comprises executing a program that causes a pager communication.

10. A method for identifying deficiencies in a distributed computer system as recited in claim 1 wherein sending notification comprises the steps of sending notification by at least one of either electronic mail, priority network message, or pager message.

11. A method for identifying deficiencies in a distributed computer system as recited in claim 1 wherein if no response is received to a notification then the method further comprises the step of sending at least one additional notification.

12. A method for identifying deficiencies in a distributed computer system as recited in claim 1 wherein said configurable schedule allows settings to be modified by a system administrator.

13. A method for identifying deficiencies in a distributed computer system as recited in claim 1 wherein automatically repairing said at least one of said plurality of deficiency conditions further comprises the step of initiating an action comprising at least one of either starting a software component or shutting down and restarting a computer.

14. A method for identifying deficiencies in a distributed computer system comprising a plurality of interconnected server computers, for initiating notification actions in response to identified deficiencies, and for attempting automated repair of identified deficiencies in a server computer, said method comprising the steps of:

detecting at least one of a plurality of predetermined deficiency conditions that interfere with normal operation of any of said plurality of server computers in said distributed computer system;

identifying the severity of said at least one of said plurality of deficiency conditions and based on the severity signaling at least one of a plurality of predefined condition levels;

evaluating said at least one of said plurality of deficiency conditions and said signaled condition level to identify actions to be taken; and using a notification and repair process stored at the server computer at which the deficiency is detected to select, based on said evaluation, a course of action including at least one of either:
    sending a deficiency notifier of said at least one of said plurality of deficiency conditions by performing at least the steps of:
      using the notification and repair process stored at the server computer to identify at least one notification to be sent, to identify at least one method for sending said at least one notification, to identify at least one destination for said at least one notification, and to identify at least one time that said at least one notification should be sent;
      using the notification and repair process stored at the server computer to identify a time that the notification action is permitted to execute for the identified notification method and based on the time that the identified notification method is permitted to execute and based on the time identified for sending the notification, then scheduling the times that notifications will be sent by the selected method; and when said scheduled times arrive, then sending said at least one notification by said identified method of notification to said at least one destination; or sending an automatic repair command for said at least one of said plurality of deficiency conditions by performing at least the steps of:

identifying at least one appropriate action to automatically repair said at least one of said plurality of deficiency conditions, said at least one action including at least one of either initiating execution of a software component or shutting down and restarting a computer system; and initiating said actions.

15. The method of claim 14, wherein the step of sending deficiency notifier comprises:

selecting a plurality of notifications;

wherein at least one of the notifications is directed to a first recipient; and wherein at least one other of the notifications is directed to a different, second recipient.

16. A computer-readable medium having computer-executable instructions comprising:

monitoring means for monitoring deficiencies in a distributed computer system comprising a server computer, said monitoring means comprising:

means for detecting at least one of a plurality of deficiency conditions in said distributed computer system; and means for initiating execution of notification and repair means for sending notification of detected deficiencies and for automatically repairing deficiencies; and said notification and repair means comprising means for identifying (1) a notification to be set, (2) a method to send said notification, (3) a destination for said notification, and (4) a time to send said notification;

means for identifying a time that a notification action is permitted to execute for the identified notification method;

means for scheduling the notification action based on (1) the identified method, (2) the time to send said notification and (3) the time that the notification action is permitted to execute for the identified notification method;

means for executing the scheduled notification action when the scheduled time arrives to send the identified notification to the identified destination via the identified method; and means for automatically repairing said detected deficiency condition by either initiating execution of a software component or shutting down and restarting said server computer.

17. The computer readable medium of claim 16 comprising:

means for storing a configurable schedule of settings adapted to be configured by a system administrator; and wherein the schedule contains a set of urgency levels comprising a warning level and an alert level; and wherein an alert notification action corresponding to the alert level indicates more urgency than a warning notification action corresponding to the warning level.

18. The computer readable medium of claim 16, wherein executing the notification action comprises sending a messaging system message.

19. The computer readable medium of claim 16, wherein executing the notification action comprises sending a network priority message.

20. The computer readable medium of claim 16, wherein executing the notification action comprises executing a notification application.

21. The computer readable medium of claim 16, wherein a plurality of notification actions is selected; and wherein the computer executable instructions comprises means for causing the computer system to insert a delay period between the execution of at least one of the notification actions and the execution of at least one other of the notification actions.

22. The computer readable medium of claim 21, wherein at least one of the notification actions is directed to a first recipient; and at least one other of the notification actions is directed to a different, second recipient.

23. A computer-readable medium as recited in claim 16 wherein the identified method comprises at least one of either electronic mail, priority network message, or pager message.

24. A computer-readable medium as recited in claim 16 wherein said notification and repair means further comprises means for sending at least one additional notification if no response is received to a notification.

25. A computer-readable medium as recited in claim 16 wherein said means for identifying (1) a notification to be sent, (2) a method to send said notification, (3) a destination for said notification, and (4) a time to send said notification retrieves information stored in a configurable schedule of settings that allows settings to be modified by a system administrator.

26. A computer-readable medium as recited in claim 16 wherein said notification and repair means comprises means for testing whether the server computer is in a maintenance mode that inhibits automatic repair actions from being performed.

27. The computer readable medium of claim 17, wherein the alert notification action is executed subsequently to an execution of the warning notification action.

28. A computer-readable medium having computer-executable instructions comprising:

a monitor component adapted to monitor deficiencies in a distributed computer system comprising a server computer, said monitoring comprising:

a detector adapted to detect at least one of a plurality of deficiency conditions in said distributed computer system;

means for determining the severity of said at least one of said plurality of deficiency conditions and signaling a predefined condition level; and means for initiating execution of a notification and repair module;

a configurable schedule of settings adapted to be configured by a system administrator; and said notification and repair module comprising means for retrieving from said configurable schedule (1) a notification to be sent, (2) a method to send said notification, (3) a destination for said notification, (4) a time to send said notification and (5) a time that the method can be used to send said notification;

a scheduler adapted to schedule a time to send the notification based on (1) the method to send said notification, (2) the time to send said notification and (3) the time that the method can be used to send said notification; and means for sending said notification to said destination at said scheduled time via said method to send said notification.

* * * * *

UNITED STATES PATENT AND TRADEMARK OFFICE
CERTIFICATE OF CORRECTION

PATENT NO. : 6,021,262
DATED : February 1, 2000
INVENTOR(S) : Joseph Paul-Emile Pierre Cote
Stephen David Thomas It is certified that error appears in the above-identified patent and that said Letters Patent is hereby corrected as shown below:

Col. 4, ln. 12: after "conditions and" change "link" to --link--

Col. 6, ln. 54: after "by" and before "administrator" insert --the--

Col. 6, ln. 55: after "is a" change "Microsofts" to --Microsoft ®--

Col. 6, ln. 56: after "such as" change "Microsoft " to --Microsoft ®--

Col. 6, ln. 62: after "such as" change "C:APPLICATIONS PAGER.EXE" to --C:\APPLICATIONS\PAGER.EXE--

Col. 9, ln. 16: after "plurality of" change "interconected" to --interconnected--

Col. 11, ln. 18: before "deficiency" insert --a--

Signed and Sealed this

Twenty-fourth Day of April, 2001

Attest:

NICHOLAS P. GODICI

Attesting Officer

Acting Director of the United States Patent and Trademark Office

UNITED STATES PATENT AND TRADEMARK OFFICE
Certificate

Patent No. 6,021,262

Patented: February 1, 2000

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Joseph P. P. Cote, Issaquah, WA; Stephen D. Thomas, Bellevue, WA; and Steven P. Master, Kent, WA.

Signed and Sealed this Second Day of October 2001.

EDDIE CHAN
*Supervisory Patent Examiner*
Art Unit 2183